(12) United States Patent
Horler

(10) Patent No.: US 11,035,369 B2
(45) Date of Patent: Jun. 15, 2021

(54) PUMP BEARING HOLDERS

(71) Applicant: Edwards Limited, Burgess Hill (GB)

(72) Inventor: Richard Horler, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 159 days.

(21) Appl. No.: 16/463,929

(22) PCT Filed: Nov. 27, 2017

(86) PCT No.: PCT/GB2017/053547
§ 371 (c)(1),
(2) Date: May 24, 2019

(87) PCT Pub. No.: WO2018/096357
PCT Pub. Date: May 31, 2018

(65) Prior Publication Data
US 2019/0368499 A1    Dec. 5, 2019

(30) Foreign Application Priority Data

Nov. 25, 2016  (GB) ...................... 1619968

(51) Int. Cl.
*F04D 19/04*     (2006.01)
*F16C 32/04*     (2006.01)
*F16C 35/00*     (2006.01)

(52) U.S. Cl.
CPC ......... *F04D 19/048* (2013.01); *F04D 19/042* (2013.01); *F16C 32/0425* (2013.01); *F16C 35/00* (2013.01); *F05D 2230/13* (2013.01); *F05D 2230/31* (2013.01); *F05D 2240/51* (2013.01); *F16C 2360/45* (2013.01)

(58) Field of Classification Search
None
See application file for complete search history.

(56) References Cited

U.S. PATENT DOCUMENTS

| 4,502,832 A * | 3/1985 | Becker | .................. F04D 19/048 |
| | | | 415/10 |
| 2013/0230384 A1* | 9/2013 | Okudera | ............... F04D 29/644 |
| | | | 415/121.2 |

FOREIGN PATENT DOCUMENTS

| DE | 202008000108 U1 | 3/2008 |
| DE | 202013009660 U1 | 2/2015 |
| EP | 2644899 A1 | 10/2013 |
| EP | 3051139 A1 | 8/2016 |

(Continued)

OTHER PUBLICATIONS

British Search Report dated Mar. 10, 2017 and Examination Report dated Mar. 13, 2017 for corresponding British Application No. GB1619968.9.

(Continued)

*Primary Examiner* — Juan G Flores
(74) *Attorney, Agent, or Firm* — Theodore M. Magee; Westman, Champlin & Koehler, P.A.

(57) ABSTRACT

A pump bearing holder has a carrier portion configured to carry a static set of magnets of a pump magnetic bearing and a support portion extending outwardly of the carrier portion to connect with a pump casing such that the pump bearing holder spans an inlet provided in the pump housing. The support portion defines a plurality of internal through-passages that, in use, allow a gas flowing through the inlet to flow through the support portion.

21 Claims, 7 Drawing Sheets

(56) References Cited

FOREIGN PATENT DOCUMENTS

EP 3051145 A1 * 8/2016 ........... F04D 19/042
EP 3051145 A1 8/2016

OTHER PUBLICATIONS

PCT Notification of Transmittal of the International Search Report and the Written Opinion of the International Searching Authority, or the Declaration dated Jan. 23, 2018, PCT Search Report and Written Opinion dated Jan. 23, 2018 for corresponding PCT Application No. PCT/GB2017/053547.

* cited by examiner

PUMP BEARING HOLDERS

CROSS-REFERENCE OF RELATED APPLICATION

This application is a Section 371 National Stage Application of International Application No. PCT/GB2017/053547, filed Nov. 27, 2017, and published as WO 2018/096357 A1 on May 31, 2018, the content of which is hereby incorporated by reference in its entirety and which claims priority of British Application No. 1619968.9, filed Nov. 25, 2016.

FIELD

The invention relates to pump bearing holders and particularly, but not exclusively, to pump bearing holders for turbomolecular vacuum pumps.

BACKGROUND

The rotor shafts of turbomolecular vacuum pumps may be provided with a hybrid bearing system comprising a mechanical (oil or grease lubricated) bearing such as a rolling bearing and a passive magnetic bearing. Since a magnetic bearing is a lubricant free, it is a clean bearing that can be installed in the main inlet region of a pump without compromising the vacuum environment. Magnetic bearings may comprise a static set of magnets which are positioned to magnetically repel an oppositely disposed rotating set of magnets mounted on the rotor assembly.

Known turbomolecular vacuum pumps use a bearing holder referred to as a spider to support the static set of magnets. A spider may comprise a centrally disposed carrier body for the static set of magnets and three legs that extend radially outwardly from the carrier body to engage the pump casing. The legs locate the holder adjacent and spanning the pump inlet such that the static set of magnets can interact with the rotating set of magnets. The bearing holder must be axially stiff to maintain the preload created by axially offsetting the magnetic bearing. Ideally the bearing holder should also be sufficiently stiff to have a resonance outside of the pump operating frequency range.

Known bearing holders act as a restriction to gas flow into the pump and so reduce the transmission probability of the pump (the likelihood of gas entering the pump actually reaching the pumping mechanism). In order to meet the need for the bearing holder to be sufficiently stiff to satisfactorily locate the static set of magnets, the legs may have to be made relatively wide and so more restrictive to gas flow than is desirable.

Turbomolecular pumps may be provided with a filter screen, often referred to as a splinter screen. The purpose of the filter screen is to prevent the ingestion of parts and other matter that may otherwise pass through the pump inlet during installation, shipping or general use. The filter screen may clip into the pump inlet and be located just upstream of the spider.

The discussion above is merely provided for general background information and is not, intended to be used as an aid in determining the scope of the claimed subject matter. The claimed subject matter is not limited to implementations that solve any or all disadvantages noted in the background.

SUMMARY

The invention provides a pump bearing holder as specified in claim 1.

The invention includes a pump as specified in claim 10.
The invention also includes a method of manufacturing a pump bearing holder as specified in claim 18.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

In the following disclosure, reference will be made to the drawings, in which.

DETAILED DESCRIPTION

Figure 1:
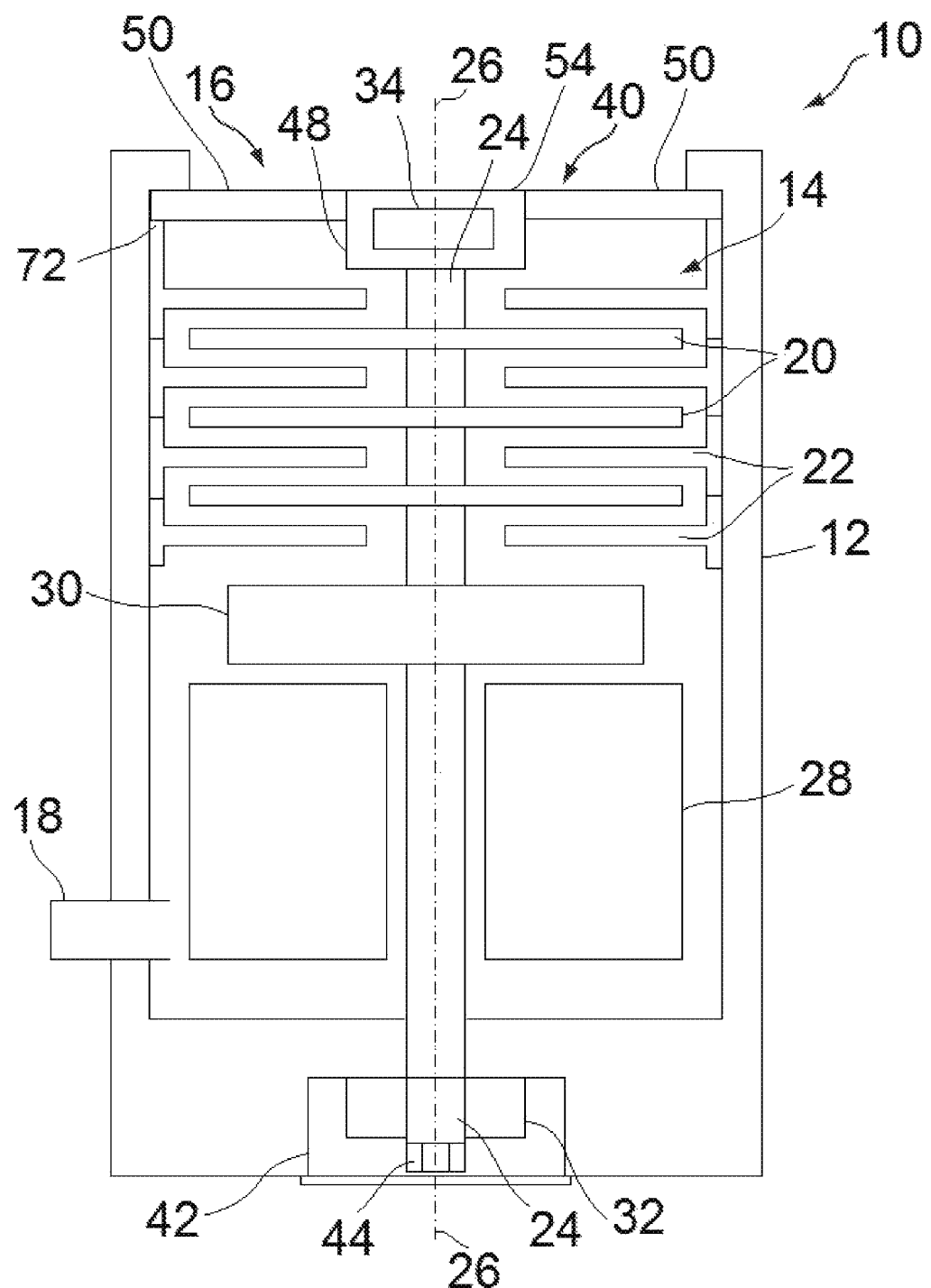
FIG. 1 is a schematic representation of a turbomolecular vacuum pump.
Figure 2:
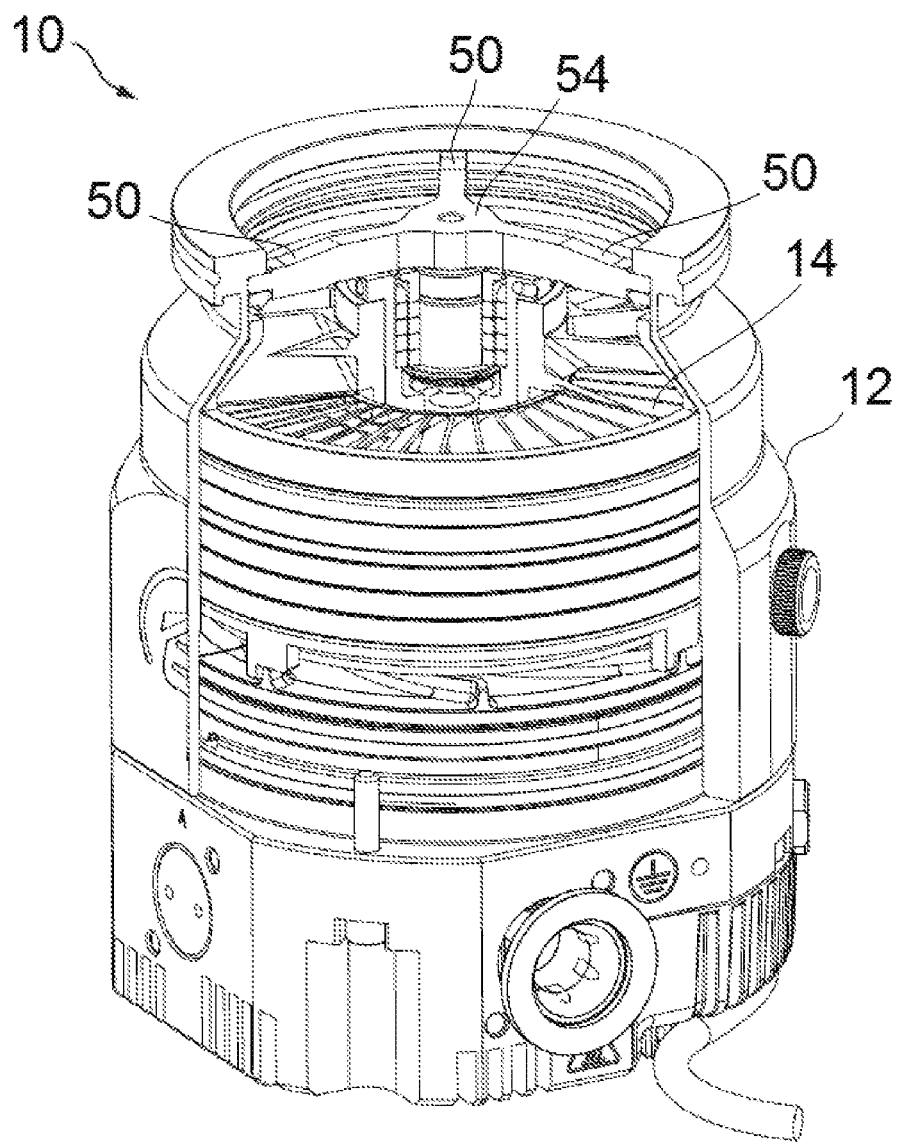
FIG. 2 is a partially cutaway perspective view of a turbomolecular vacuum pump.
Figure 3:
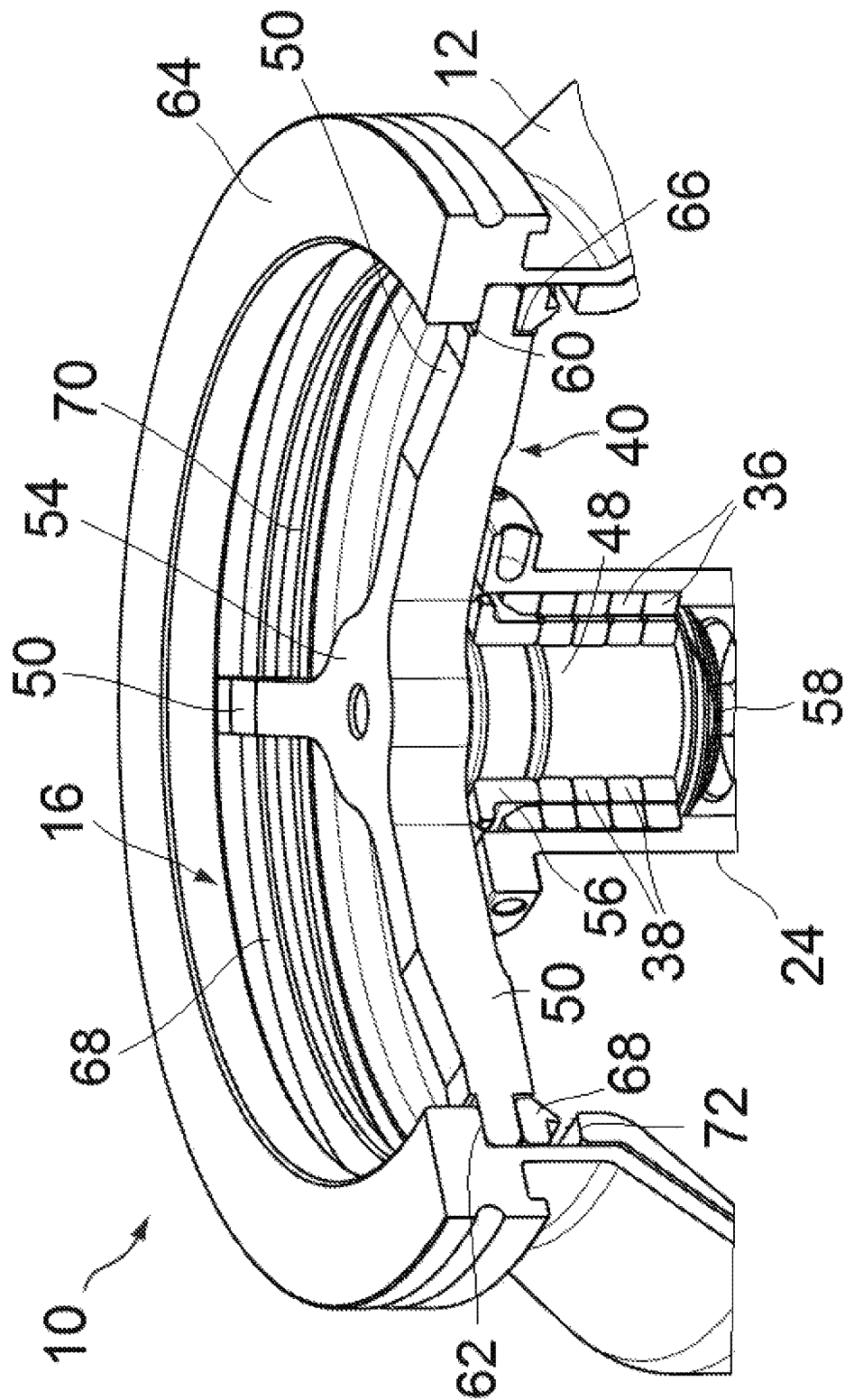
FIG. 3 is an enlargement of a portion of FIG. 3.

FIG. 1 is a schematic representation of a turbomolecular pump 10. FIGS. 2 and 3 show an example of a turbomolecular pump 10 that may embody the features of the pump illustrated by FIG. 1. Referring to FIG. 1, the turbomolecular pump 10 may comprise a casing, or housing, 12, a pumping mechanism 14 disposed in the housing, an inlet 16 and an outlet 18. The pumping mechanism 14 may comprise a turbomolecular pumping mechanism that comprises a plurality of rotor blades 20 disposed in interleaving relationship with a plurality of stacked stator discs 22. The rotor blades 20 are mounted on, or integral with, a rotor shaft 24 that has a longitudinal axis (axis of rotation) 26. The rotor shaft 24 is driven to rotate about the axis of rotation 26 by a motor 28. The pumping mechanism 14 may additionally comprise a molecular drag pumping mechanism 30, which may be a Gaede, Holweck or Siegbahn mechanism. There may be additional, or alternative, pumping mechanisms downstream of the molecular drag pumping mechanism 30. For example, there may be an aerodynamic pumping mechanism comprising a regenerative mechanism. The turbomolecular pump 10 may be capable of evacuating an enclosure to about $10^{-3}$ to $10^{-10}$ mbar. In use, the rotor shaft 24 may rotate at speeds of between about 20,000 and 90,000 revolutions per minute.

The rotor shaft 24 is supported by a plurality of bearings 32, 34. The plurality of bearings may comprise two bearings 32, 34 positioned at, or adjacent, respective ends of the rotor shaft 24 as shown. Alternatively, the two bearings 32, 34 may be disposed at locations intermediate the ends of the rotor shaft 24. In the example illustrated by FIG. 1, a rolling bearing 32 supports a first end portion of the rotor shaft 24 and a magnetic bearing 34 supports a second end portion of the rotor shaft 24. The magnetic bearing 34 may be disposed upstream of the pumping mechanism 14 and in the illustrated example is disposed adjacent the inlet 16. A back-up rolling bearing (not shown) may optionally be provided adjacent the magnetic bearing 34. As best seen in FIG. 3, the magnetic bearing 34 may comprise a rotating set of magnets 36 carried by the rotor shaft 24 and an oppositely disposed static set of magnets 38 carried by a pump bearing holder 40 that spans the inlet 16 to connect with the pump housing 12.

The turbomolecular pump 10 may additionally comprise a lubricant supply system 42 and a lubricant transfer device 44 provided on the rotor shaft 24 to transfer lubricant from the lubricant supply system to the rolling bearing 32, The lubricant transfer device 44 may be a taper nut fitted on the rotor shaft 24 and the lubricant may be a liquid, for example an oil.

Referring to FIGS. 2 and 3, the pump bearing holder 40 comprises a carrier portion 48 configured to carry the static set of magnets 38 and a support portion, which in this example comprises a plurality of legs 50 that extend outwardly with respect to the carrier portion to connect with the pump housing 12 such that the pump bearing holder 40 spans the inlet 16. In this example, the support portion further comprises a centrally disposed hub 54 to which the inner ends of the legs 50 are attached. The carrier portion 48 may comprise a cylindrical body, or boss, projecting from the hub 54. The carrier portion 48 may be disposed at least substantially coaxially with the hub 54. The static set of magnets 38 is disposed around the circumference of the carrier portion 48. The static set of magnets 38 may comprise a plurality of annular magnets. The annular magnets may be stacked one upon another and surround the carrier portion 48. The stacked annular magnets may be held between an adjuster ring 56 and a holding unit 58. The holding unit 58 may comprise one or more washers, a resilient biasing member, such as a wave washer, and a circlip that engages a groove provided in the carrier portion 48 to secure the holding unit and the static set of magnets 38 to the carrier portion. The adjuster ring 56 may engage threading (not shown) provided on the carrier portion 48. The adjuster ring 56 may be screwed back and forth against the resilient biasing member of the holding unit 58 to move the static set of magnets 38 along the carrier portion to adjust the magnetic bearing 34 preload. In other examples, the set of static magnets 38 may be provided as a part of a sub-unit, or magnetic bearing cartridge, that can be fitted onto the carrier portion 48. The carrier portion 48 may be provided with external threading to engage internal threads of the magnetic bearing cartridge to allow adjustment of the position of the magnetic bearing cartridge on the carrier portion to adjust the preload.

The legs 50 are disposed at equidistant spaced apart intervals about the hub 54 so that in an example with three legs as illustrated, there is a gap of 120° between adjacent legs. The radially outer, or free, ends of the legs 50 may be provided with a first recess 60 disposed on the upstream side (the upper side as view in FIGS. 1 to 3) of the leg. The first recess 60 is configured to mate with a shoulder 62 that is defined by the underside of an annular wall 64 of the pump housing 12. The annular wall 64 defines the inlet 16. The legs 50 may be provided with a second recess 66 disposed generally opposite the first recess 60 on the downstream side of the leg. The pump bearing holder 40 may be secured in position in the pump housing 12 by an annular body, or spider ring, 68 and a resilient body, or bodies, 70 trapped between the annular body 68 and a fixed shoulder 72 disposed within the pump housing 12. The resilient body 70 may be a wave washer. The fixed shoulder 72 may be an end face of the stacked stator discs 22 so that the resilient body, or bodies, 70 holds both the pump bearing holder 10 and the stator discs 22 in place.

Figure 4:
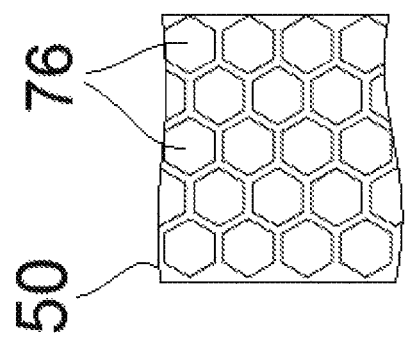
FIG. 4 is a schematic plan view of a portion of a leg of pump bearing holder of the turbomolecular vacuum pump.

FIG. 4 is a schematic plan view of a portion of a leg 50 of the pump bearing holder 40. The leg 50 has a honeycomb structure that defines a plurality of internal through-passages 76 in the leg. The internal through-passages 76 allow a gas flowing through the inlet 16 to pass through the leg 50 towards the pumping mechanism 14. The through-passages 76 may extend from the upstream side of the legs 50 to the downstream side (the lower side as viewed in FIGS. 1 to 3). The through-passages 76 may extend generally parallel to the longitudinal axis 26 of the rotor shaft 24. Having through-passages 76 in the legs 50 allows the possibility of the passage of gas through the pump bearing holder 40 that would otherwise be repelled by it. This increases the gas throughput and so the transmission probability, thereby boosting the effective pumping speed of the turbomolecular pump 10.

A honeycomb structure has high axial stiffness. Thus, the ability of the pump bearing holder 40 to hold the static set of magnets 38 in place and maintain the preload set by the magnetic bearing 34 will not be adversely affected by having a porous structure. Furthermore, the porous structure allows a reduction in the weight of the pump bearing holder 40 as compared with a comparably sized solid structure, which assists in maintaining high resonant frequencies. If the legs 50 require additional stiffening, the porous structure makes it possible to increase the leg width to increase stiffness, without significantly adversely affecting pumping speeds. Each leg 50 may have a honeycomb structure over its entire length or over just a part of its length as desired. For example, since gas would not be expected to flow through the portion of the legs 50 that is between the first and second recesses 60, 66, it may be decided to have a solid leg structure between the recesses 60, 66 and have a honeycomb structure for the remainder of the length of the leg between the inboard end of the recesses and the hub 54. Similarly, the carrier portion 48 and hub 54 may be at least substantially solid, rather than porous.

Figure 5:
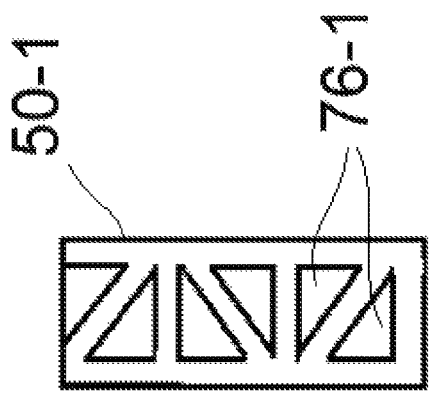
FIG. 5 is a schematic plan view illustrating an alternative leg structure for the pump hearing holder.

FIG. 5 is a schematic plan view illustrating an alternative structure of a leg 50-1 for the pump bearing holder 40. The difference between the leg 50 and the leg 50-1 is that instead of having a honeycomb structure, the leg 50-1 has internal through-passages 76-1 comprising a plurality of perforations that have a triangular cross-section. The through-passages 76-1 may be arranged inline as a series of extending along the length of the leg 50-1. The through-passages 76-1 may have a right angled triangular cross-section and adjacent through-passages 76-1 may be arranged as mirror images of one another so as to allow denser packing of the through-passages along the length of the leg 50-1.

Figure 6:
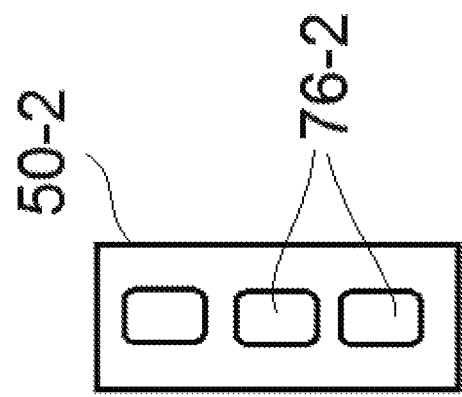
FIG. 6 is a schematic plan view illustrating another alternative leg structure for the pump bearing holder.

FIG. 6 is a schematic plan view illustrating another alternative structure of a leg 50-2 for the pump hearing holder 40. The difference between the leg 50 and the leg 50-2 is that instead of having a honeycomb structure, the leg 50-2 has internal through-passages 76-2 comprising a plurality of generally rectangular cross-section perforations. The through-passages 76-2 may be arranged inline as a series of extending along the axial centreline of the leg 50-2. The through-passages 76-1, 76-2 extend from the upstream side of the legs 50-1, 50-2 to the downstream side and may extend generally parallel to the rotor shaft 24.

Figure 7:
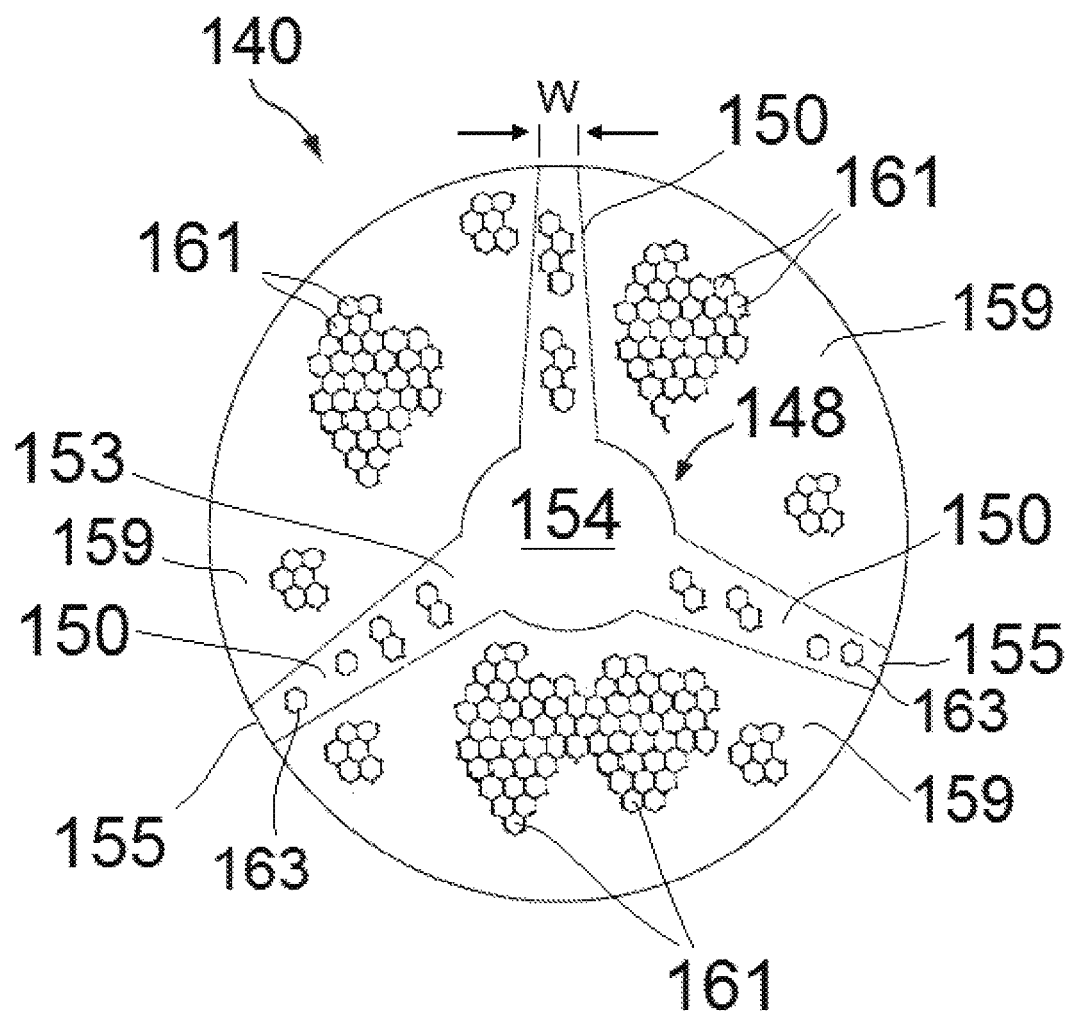
FIG. 7 is a schematic plan view of a pump bearing holder comprising filter screen members.

FIG. 7 shows another pump bearing holder 140 that may be used in a pump such as the turbomolecular pump 10 illustrated by FIGS. 1 to 3. The pump bearing holder 140 comprises a carrier portion 148 (not visible in the drawing)

and a support portion comprising a plurality of legs 152 extending radially outwardly with respect to the carrier portion. The support portion may further comprise a hub 154 that is contiguous, and may be axially aligned, with the carrier portion 148. The carrier portion 148 may be a generally cylindrical body projecting from the hub 154 in at least substantially similar fashion to the carrier portion 48 shown in FIG. 3. There may be three legs 152 that each have an inner end 153 joined to the hub 154 and an outer, or free end, 155. The legs 152 may be disposed at equidistant spaced apart intervals about the hub 154 so that in an example with three legs as illustrated, there will be a gap of 120° between adjacent legs. The legs 150 comprise a plurality internal through-passages 163 which may be the same as or similar to the through-passages 76, 76-1, 76-2 those shown in FIGS. 3 to 5.

The gaps between the legs 150 may approximate to a circular sector bounded by the facing sides of adjacent legs 150, the outer periphery of the hub 154 and an imaginary circle whose circumference coincides with the free ends 155 of the legs. In this example, the gaps are filled by respective filter screen members 159. The filter screen members 159 may be integral with the legs 150 or separate members fitted between and secured to the legs. The filter screen members 159 may comprise plurality of internal through-passages 161 to allow the passage of gas through the inlet 16 into the pumping mechanism 14. The through-passages 161 may be defined by a honeycomb structure as shown in FIG. 7.

In other examples, a perforated structure may be provided in which the through-passages 161 may have generally circular or other polygonal cross section shapes.

The provision of the filter screen members 159 between the legs 150 may increase the overall stiffness of the pump bearing holder 140 and allow for a relative decrease in the width W of the legs of the pump bearing holder as compared with a pump bearing holder, such as the pump bearing holder 40, which simply has gaps between the legs.

Figure 8:
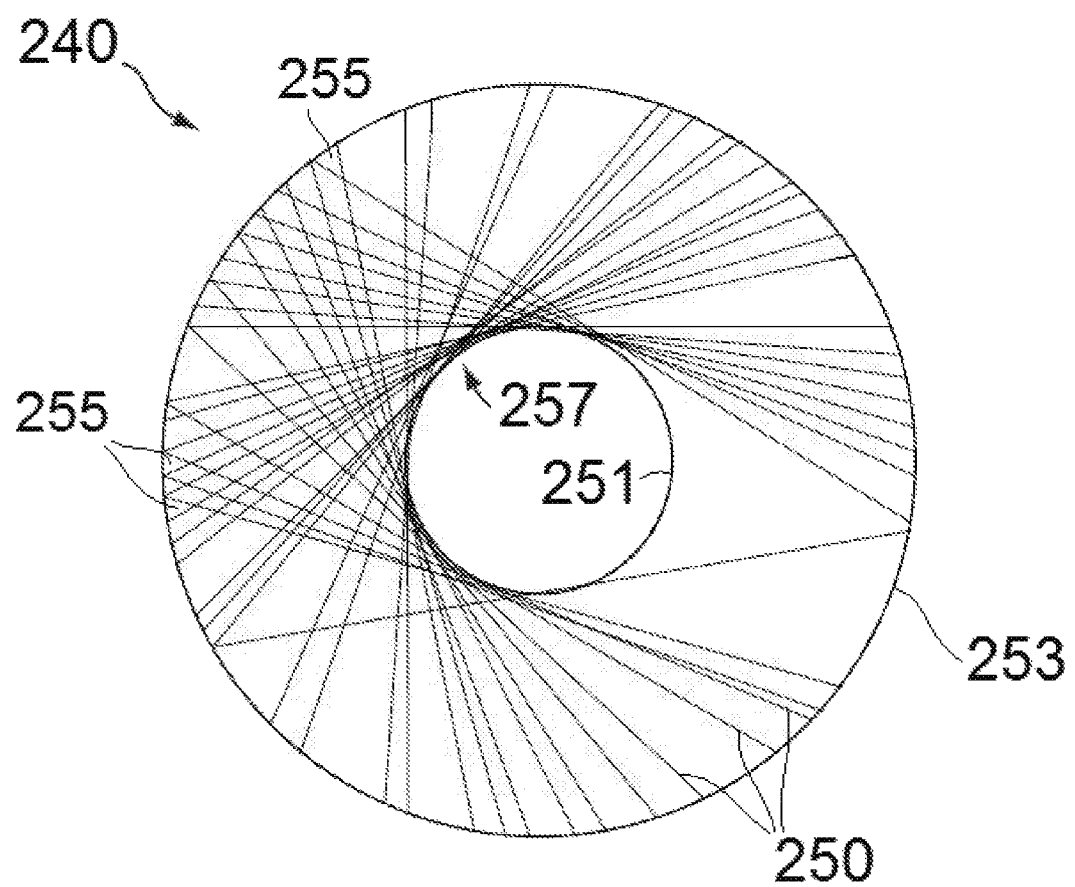
FIG. 8 is a schematic plan view of a pump bearing holder comprising a filter screen.

FIG. 8 is a schematic plan view of another pump bearing holder 240 that may be used in a pump such as the turbomolecular pump 10 illustrated by FIGS. 1 to 3. The pump bearing holder 240 may be generally planar. The pump bearing holder 240 may be generally annular disc-like body. The pump bearing holder 240 may comprise a plurality of elongate members 250 that extend from an inner periphery 251 of the pump bearing holder to an outer periphery 253. Although not shown in FIG. 8 due to difficulty in representation, the elongate members 250 are provided in sufficient number and configured so as to define a net-like structure, or weave, covering the major surfaces of the pump bearing holder 240. The elongate members 250 are configured to define a plurality of internal through-passages 255 that provide sufficient porosity to permit gas flow through at least substantially the entirety of the major surfaces of the pump bearing holder 240. In some examples, the configuration of the elongate members 250 may be such as to provide a relatively open weave designed to provide sufficient stiffness to support the magnetic bearing 34 and relatively high gas throughput values. In other examples, the configuration of the elongate members 250 may be such as to provide a relatively more closed weave that allows a relatively lower throughput of gas, but may provide relatively greater stiffness or a better filtering capacity.

The configuration of the elongate members 250 may be such that the joining of the elongate members adjacent the inner and outer peripheries 251, 253 forms relatively strong inner and outer ring pieces that have relatively little or no porosity. The inner ring piece defines a carrier portion 257 comprising an aperture configured to receive a magnetic bearing cartridge that includes the static set of magnets. The outer ring piece may provide stiffening and facilitate engagement with the pump housing 12. It will be understood that the relatively low, or absence of, porosity at the inner and outer peripheries 251, 253 of the pump bearing holder 240 will have little or no impact on the gas throughput as the passage of gas there will be blocked by the respective interfaces with the magnetic bearing cartridge and the pump housing.

In some examples the configuration of the elongate members 250 may be such as to provide regions of greater and lesser porosity between the inner and outer peripheries 251, 253 of the pump bearing holder 240. Thus, the elongate members 250 may be arranged to provide a plurality of relatively less porous regions to provide relatively greater stiffness that may, for example, represent, or define, pseudo-legs. This may be achieved by one or more of: having different thickness elongate members, having elongate members whose width varies along their length and varying the spacing between the elongate members.

For ease of production by, for example, an additive machining process, it may be desirable to form the pump bearing holder 240 as a laminate comprising several relatively thin layers have a structure the same as or similar to that shown in FIG. 8. It may also be desirable to form a carrier portion separately and then join that to the support portion.

Figure 9:
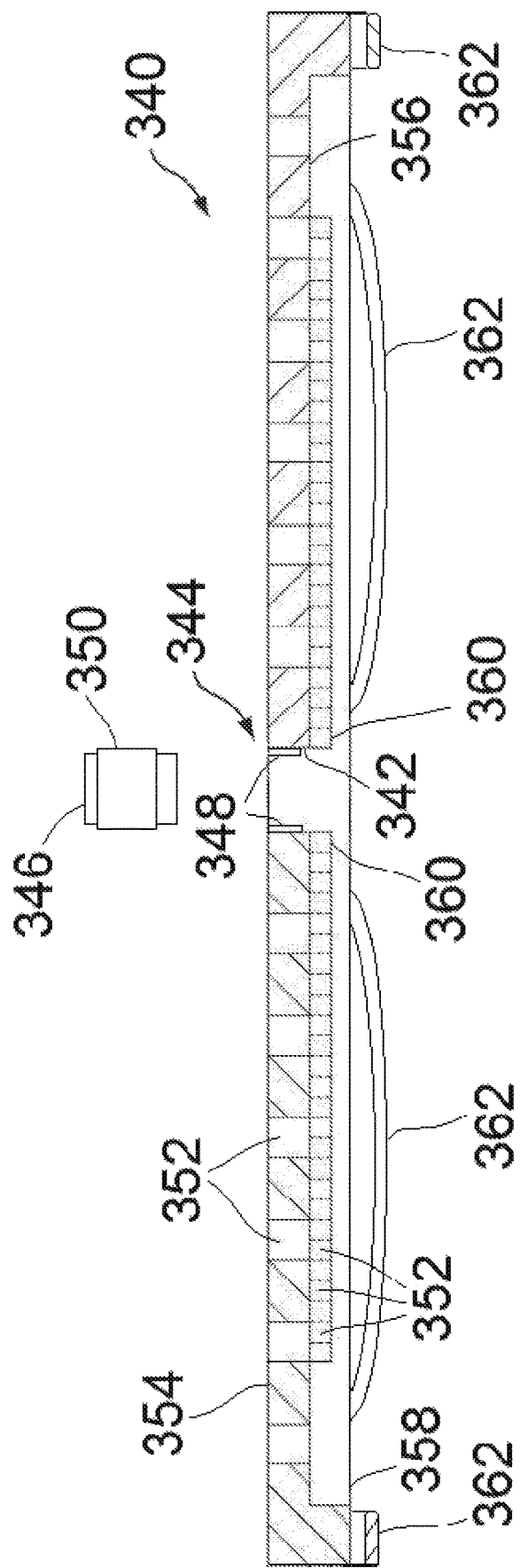
FIG. 9 is a schematic cross-section of another pump bearing comprising a filter screen.

FIG. 9 is a schematic representation of another pump bearing holder 340 that may be used in a pump such as the turbomolecular pump 10 illustrated by FIGS. 1 to 3. The pump bearing holder 340 may be an annular body with an inner periphery defined by a wall 342 that defines a through-hole 344. A magnetic bearing cartridge 346 may be fitted in the in the through-hole 344. The pump hearing holder 340 comprises a carrier portion in the form of internal threading 348 provided on the wall 342. The magnetic bearing cartridge 346 may have external threading 350 so that the magnetic bearing cartridge 346 can be screw fitted to the pump bearing holder 340 and to allow the axial position of the magnetic hearing cartridge to be adjusted to set the preload of the magnetic bearing.

The pump bearing holder 340 is provided with a plurality of through-passages 352 that are configured to allow a gas flowing through the pump inlet 16 to pass through the pump bearing holder into the pumping mechanism 14. In some examples, the through-passages 352 may be distributed across the entirety of the major surfaces 354, 356 of the pump bearing holder 340 to facilitate a high gas throughput. The through-passages 352 may be configured to provide both a high gas throughput and allow the pump bearing holder 340 to function as a filter screen for the pump inlet 16 so that a separate filter screen is not needed.

The pump bearing holder 340 may be thicker at its outer periphery to define a rim 358. The rim 358 may provide additional stiffness to facilitate location of the pump hearing holder 340 in the housing 12. The pump bearing holder 340 may also be provided with one or more areas of increased thickness 360 to provide selective stiffening between the inner and outer peripheries of the pump bearing holder. The areas of increased thickness 360 may be relatively narrow bands extending outwardly of the through-hole 344. The areas of increased thickness 360 may define a plurality of radially extending pseudo-legs or ribs. The areas of increased thickness may be used to tune the axial stiffness of the pump bearing holder 340 but in order to reduce material usage and maintain relatively high gas throughput would be relatively narrower than legs such as the legs 50, 150.

The through-passages 352 may vary in size. For example, as shown in FIG. 9, there may be at least one first plurality of relatively larger less densely spaced through-passages and at least one second plurality of relatively smaller diameter more densely packed through-passages. A pump bearing holder comprise relatively smaller internal through-passages toward the centre of the support portion and relatively larger internal through-passages toward the outer periphery.

Instead of having a separate resilient body, such as the wave washer 70 shown in FIG. 3, the pump bearing holder 340 may be provided with one or more integral resilient bodies 362 to provide a biasing force at least substantially corresponding to that provided by a separate resilient body such as a wave washer 70. The integral resilient bodies 362 may comprise a plurality of generally C-shaped members disposed at spaced apart intervals around the outer periphery of the pump bearing holder 340 and configured to flex towards the major surface 356 of the pump bearing holder 340 when compressed between the shoulders 62, 72. The resilient members 362 may have an oblong or generally oval cross-section.

It will be understood that although not shown in the drawings, the pump bearing holders 40, 140 may be provided with integral resilient members in similar fashion to the pump bearing holder 340. The integral resilient members may be combined with an integral annular body 68. The integral annular body or resilient members may extend between adjacent legs 50, 150 adjacent their free, or radially outer, ends.

Pump bearing holders according to the invention may be manufactured by metal injection moulding (MIM), plastic moulding, casting or machined from solid. The pump bearing holders 40, 140, 240, 340 may be manufactured using one or more of the following techniques: additive machining or generative machining, photo etching, laser cutting and water jet cutting. Additive machining includes 3D printing, fused deposition melting, laser melting, electron beam melting, selective laser sintering (SLS), metal sintering, layer-laminate manufacturing including layer laminating extrusion, stereolithography and fused layer modelling (FLM).

It is believed that known spiders restrict gas transmission by approximately 10%. The illustrated pump bearing holders may allow the recovery of approximately half that figure.

Known turbomolecular pumps have a separate filter screen disposed upstream of the spider. By incorporating screening functionality into the pump bearing holder, it is possible to dispense with a separate filter screen. This provides the possibility of reducing the overall height (as viewed in FIG. 1) of the pump.

To provide know spiders with sufficient stiffness without increasing the width or their legs, and so the restriction of gas flow into the pump, the depth of the legs may be increased. The provision of filter screen members between the legs of a pump bearing holder may provide stiffening that allows the use of relatively narrow legs without the need to increase their depth. This again provides the possibility of reducing the overall height of the pump.

The pump bearing holders and filter screen members may be made of any suitable material, examples being aluminium, stainless steel, titanium and an engineering plastic such as PEEK.

Although the invention is not limited to these examples, the internal through-passages may have a width in the range 5 to 20 mm and the depth of the pump bearing holder may be in the range 1 and 10 mm. The spacing between the internal through-passages may be between 1 and 2 mm.

In examples of the pump bearing holder comprising legs as illustrated in FIGS. 1 to 7, the legs and hub may be formed separately of the carrier portion and then fixed to the carrier portion. This may be desirable where there the legs and hub are formed by additive machining, photo etching, laser cutting or waterjet cutting as it may reduce the overall depth of the part that has to be formed, thereby reducing manufacture time. For this reason, pump bearing holders such as those illustrated by FIGS. 8 and 9 may prove advantageous as being relatively thin, manufacturing times should be relatively low.

The invention has been described and illustrated in connection with a pump bearing holder of a turbomolecular pump. It is to be understood that this is not to be taken as limiting. Embodiments of the invention may be applied to other pumps where it is, for example, desirable to do one or more of reducing the negative affect on gas throughput of a pump bearing holder positioned in the gas flow path to the pumping mechanism, reducing the pump height or reducing the component account.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A turbomolecular vacuum pump bearing holder to hold a static set of magnets of a pump magnetic bearing, said pump bearing holder comprising a carrier portion configured to carry said static set of magnets and a support portion extending outwardly of the carrier portion to connect with a pump casing such that the pump bearing holder spans an inlet provided in said pump casing, wherein said support portion comprises a plurality of legs projecting from said carrier portion to engage said pump casing and a plurality of perforations that define a plurality of internal through-passages that extend through said plurality of legs and that, in use, allow a gas flowing through said inlet to flow through said plurality of legs.

2. The turbomolecular vacuum pump bearing holder as claimed in claim 1, wherein said support portion comprises an integral resilient biaser that, in use, is disposed between said support portion and said pump casing to push said support portion against said pump casing.

3. The turbomolecular vacuum pump bearing holder as claimed in claim 1, wherein said support portion is annular so as to surround said carrier portion and define a filter screen for said inlet.

4. The turbomolecular vacuum pump bearing holder as claimed in claim 1, wherein respective gaps are defined between adjacent said plurality of legs and respective filter screen members are disposed in said gaps.

5. The turbomolecular vacuum pump bearing holder as claimed in claim 4, wherein said filter screen members are integral with said plurality of legs.

6. The turbomolecular vacuum pump bearing holder as claimed in claim 1, wherein said support portion comprises a honeycomb structure that defines said plurality of perforations.

7. The turbomolecular vacuum pump bearing holder as claimed in claim 1, wherein said support portion comprises at least nine of said plurality of perforations.

8. A turbomolecular vacuum pump comprising a pump casing defining a pump inlet and a turbomolecular vacuum pump bearing holder as claimed in claim 1, wherein said support portion engages said pump casing and said pump bearing holder spans said pump inlet.

9. A turbomolecular vacuum pump comprising:
a casing defining an inlet;
a pumping mechanism having a rotor shaft;
a magnetic bearing supporting said rotor shaft and comprising a rotating magnet set carried by said rotor shaft and a static magnet set; and
a pump bearing holder holding said static magnet set,
wherein said pump bearing holder comprises a carrier portion to which said static magnet set is fitted and a support portion extending from said carrier portion to engage said casing such that said pump bearing holder spans said inlet and said support portion comprises a plurality of legs projecting from said carrier portion to engage said casing and a plurality of perforations that define a plurality of internal through-passages that extend through said plurality of legs and that, in use, allow a gas flowing through said inlet to flow through said plurality of legs towards said pumping mechanism.

10. The turbomolecular vacuum pump as claimed in claim 9, wherein said support portion comprises an integral resilient biaser disposed between said support portion and said casing to push said support portion towards said casing.

11. The turbomolecular vacuum pump as claimed in claim 9, wherein said support portion is annular so as to surround said carrier portion and define a filter screen for said inlet.

12. The turbomolecular vacuum pump as claimed in claim 9, wherein respective gaps are defined between adjacent said plurality of legs and respective filter screen members are disposed in said gaps.

13. The turbomolecular vacuum pump as claimed in claim 12, wherein said filter screen members are integral with said plurality of legs.

14. The turbomolecular vacuum pump as claimed in claim 9, wherein said support portion comprises a honeycomb structure that defines said plurality of perforations.

15. A method of manufacturing a turbomolecular vacuum pump bearing holder comprising:
providing a carrier portion configured to carry a set of static magnets of a magnetic bearing;
providing a support portion extending outwardly of said carrier portion to engage a pump housing such that said pump bearing holder spans an inlet provided in said pump housing; and
providing a plurality of perforations that define a plurality of internal passages in said support portion such that, in use, a gas flowing into said inlet can pass through said plurality of internal passages to enter said pump housing;
wherein providing said support portion comprises forming a plurality of legs projecting from said carrier portion to engage said pump housing, said plurality of internal passages extending through said plurality of legs.

16. The method as claimed in claim 15, wherein respective gaps are defined between adjacent said plurality of legs and further comprising providing respective filter screen members in said gaps.

17. The method as claimed in claim 15, wherein said support portion is annular so as to surround said carrier portion and define a filter screen for said inlet.

18. The method as claimed in claim 15, wherein providing a plurality of perforations that define a plurality of internal passages in said support comprises forming at least a part of said support portion as a honeycomb structure.

19. The method as claimed in claim 15, further comprising providing said support portion with at least one integral resilient biaser configured to push said support portion against said pump housing.

20. The method as claimed in claim 15, wherein providing said support portion comprises forming said support portion by at least one of:
i) additive machining;
ii) photo etching;
iii) laser cutting; and
iv) waterjet cutting.

21. The method as claimed in claim 15, wherein said carrier portion is integral with said support portion.

* * * * *